United States Patent [19]

Spicer et al.

[11] Patent Number: 4,758,460

[45] Date of Patent: * Jul. 19, 1988

[54] AIR FILTER

[75] Inventors: Barry Spicer, Pattishall; Joseph T. Wills, Chapel Brampton, both of England

[73] Assignee: Pipercross Limited, Lutterworth, England

[ * ] Notice: The portion of the term of this patent subsequent to Dec. 23, 2003 has been disclaimed.

[21] Appl. No.: 862,286

[22] Filed: May 12, 1986

[30] Foreign Application Priority Data

May 29, 1985 [GB] United Kingdom ............... 8513540
Jan. 13, 1986 [GB] United Kingdom ............... 8600720

[51] Int. Cl.⁴ ................... B32B 1/08; B32B 3/26; B32B 5/18
[52] U.S. Cl. ..................... 428/159; 55/487; 428/308.4; 428/311.1; 428/316.6; 428/317.9; 428/921; 427/244
[58] Field of Search ............. 55/485, 486, 487, 524, 55/525, 526, DIG. 13, DIG. 42; 427/244; 428/316.6, 317.7, 317.9, 159, 160, 306.6, 308.4, 311.1, 311.5, 921

[56] References Cited

U.S. PATENT DOCUMENTS

| 3,228,820 | 1/1966 | Samson | 428/316.6 |
| 3,720,574 | 3/1973 | Kunc | 428/316.6 |
| 4,099,943 | 7/1978 | Fischman et al. | 428/317.7 |
| 4,178,161 | 12/1979 | Rudner et al. | 55/524 |
| 4,193,779 | 3/1980 | Hencke | 55/DIG. 13 |
| 4,296,166 | 10/1981 | Ogino | 428/316.6 |
| 4,631,077 | 12/1986 | Spicer et al. | 55/487 |

FOREIGN PATENT DOCUMENTS

| 1224471 | 1/1968 | United Kingdom | 428/316.6 |
| 1200377 | 7/1970 | United Kingdom | 428/316.6 |

Primary Examiner—William J. Van Balen
Attorney, Agent, or Firm—Bert J. Lewen; Henry Sternberg

[57] ABSTRACT

An air filter for an internal combustion engine comprises a composite formed of first and second layers of reticulated foam plastics material with an open-mesh substrate between them, the two layers being bonded together through the openings in the open-mesh substrate and the composite impregnated with a dust-retaining substance. This arrangement results in a reservoir of the dust-retaining substance being maintained between the first and second layers of foam plastics material.

29 Claims, 5 Drawing Sheets

 
FIG. 5a　　　　　FIG. 5b
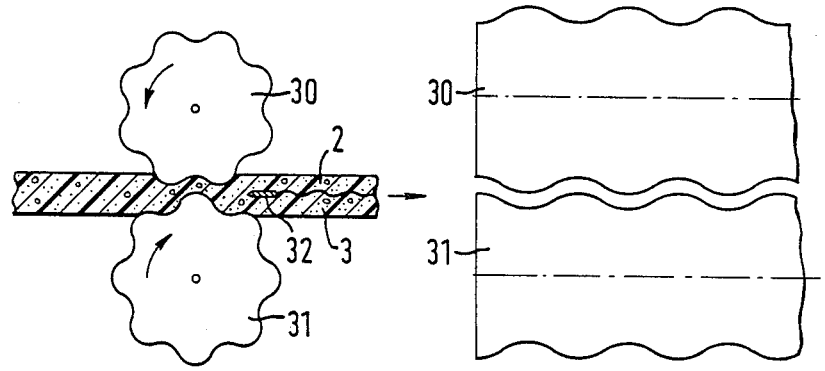
FIG. 6a　　　　　FIG. 6b
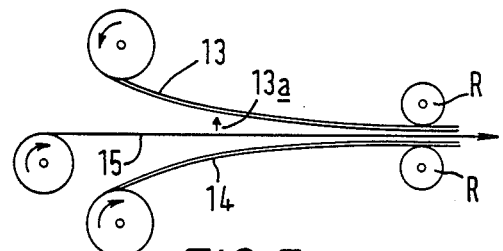
FIG. 7
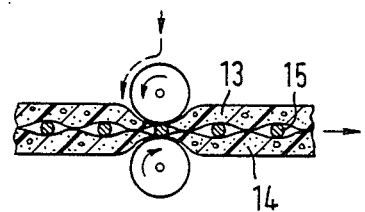
FIG. 8

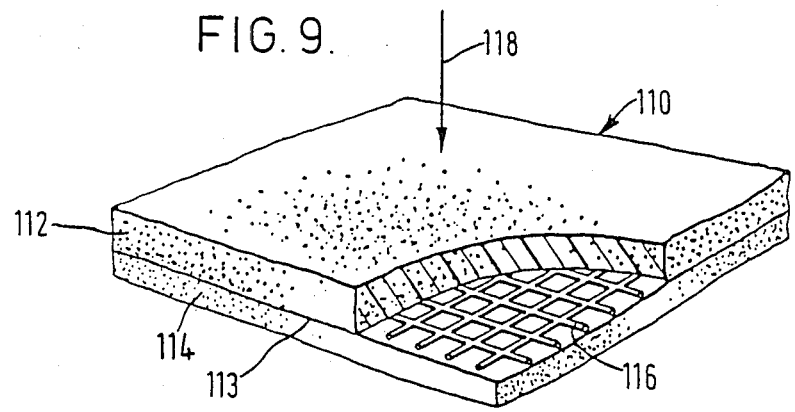
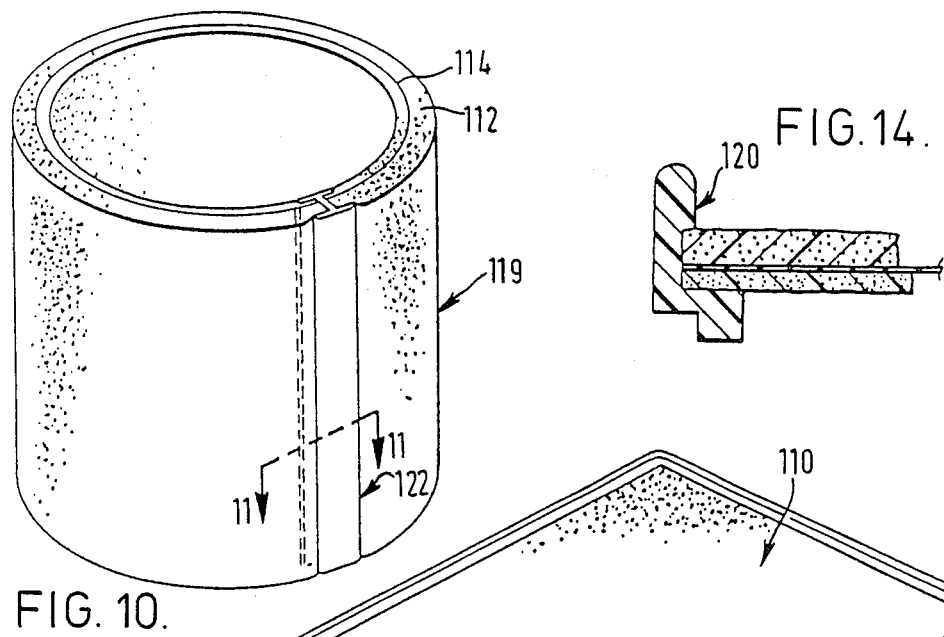
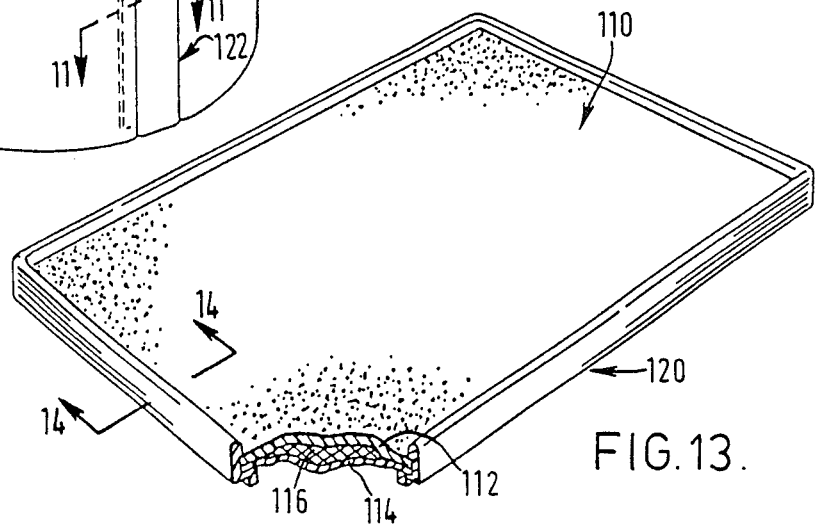

AIR FILTER

FIELD OF THE INVENTION

This invention relates to an air filter, for example for use in the air-intake line to an internal combustion engine.

BACKGROUND OF THE INVENTION

It has been common for air filters for automotive vehicles to be made of paper which is pleated to provide a large surface area for trapping dust particles etc., which are carried in the air passing to the internal combustion engine. Recently filters of plastics foam have become available, consisting of a single sheet of plastics foam impregnated with a substance (e.g. a plasticiser, or an engine oil) which serves to hold the particles which have become trapped by the filter, but these are of limited effectiness.

SUMMARY OF THE INVENTION

In accordance with this invention, as seen from one aspect, there is provided an air filter which comprises first and second layers of reticulated foam plastics material disposed face-to-face with an open-mesh substrate disposed between them, these two layers being bonded together at their interface through the openings in the open-mesh substrate, and the two layers being impregnated with a dust-retaining substance: the result is that a reservoir of the dust-retaining substance is maintained at the open-mesh substrate between the first and second layers of foam material.

With the arrangement, dust tends to be retained mainly at or adjacent the interface. The filter is found to have a longer effective life than the comparable prior pleated paper or prior foam plastics filters and is moreover failsafe: the progressive collection of dust at the interface causes progressive constriction of the pores at the interface and gradually a pressure drop builds up across the filter layers, causing these layers to be compressed and eventually to shut off at least the second layer and thus starve the engine of air. Reticulated foam plastics material is a foam plastics material of which all cells are open.

Also in accordance with this invention, as seen from a second aspect, there is provided an air filter which includes at least one layer or filter material and, upstream of that layer or those layers (with respect to the flow of air through the filter when in use), a further layer which comprises a reticulated foam plastics material which is dry, at least semi-rigid and of sufficiently coarse pore-size that its upstream surface behaves as a multiplicity of cyclone separators distributed over that surface. The effect is to cause particles in the incoming air to drop off outside the filter. It is found that significant quantities of particles are separated out at the upstream surface of this further layer, and fall away without penetrating into the filter materials. This further layer thus extends the effective life of the filter.

Also in accordance with this invention, as seen from a third aspect, there is provided an air filter which includes at least one layer of filter material and, downstream of that layer or those layers (with respect to the flow of air through the filter when in use), a further layer of reticulated foam plastics material which has been post-treated with a fire-retardant substance, such that this layer acts both as a filter and a fire-break. This filter is effective in its primary function (i.e. filtering) but is also effective in preventing the spread of a fire should for some reason the internal combustion engine blow back or even explode. Such an occurence is however extremely unlikely to be due to any failure of the embodiments of filters described in this specification: these particular examples of filters serve very effectively to retain any particles which they trap, with minimal risk that any of these trapped particles will be drawn from the filter (even when aged) and into the engine.

Also in accordance with this invention, as seen from a fourth aspect, there is provided an air filter which includes at least one layer of filter material and, downstream of that layer or those layers (with respect to the flow of air through the filter when in use), a further layer of reticulated foam plastics filter material of sufficiently small pore-size as to clog rapidly in the event of a rupture in or breakdown of the upstream layers. This further layer provides a safety feature for the engine and may comprise foam plastics material which has been permanently compressed in thickness.

BRIEF DESCRIPTION OF THE DRAWINGS

Embodiments of this invention will now be described by way of exaples only and with reference to the accompanying drawings, in which:

FIGS. 5a and 5b are cross-sections, mutually at right angles to each other, through a layer of filter material intended to be used in the air filter of FIGS. 1, 2 or 3, 4;

FIGS. 6a and 6b are a cross-section and a longitudinal section through an apparatus for forming layers of material as shown in FIGS. 5a, 5b;

FIG. 7 is a diagram of an apparatus for forming a composite filter material used in the filters of FIGS. 1–4;

FIG. 8 is a diagram of an apparatus for impregnating the composite;

FIG. 9 is a perspective view of a filter of the invention, one edge being separated to show its structure;

FIG. 10 is a perspective view of a hollow cylindrical configuration of the filter of FIG. 9:

FIG. 13 is a perspective view of a flat configuration of the filter of FIG. 9 mounted in a gasket;

FIG. 14 is a cross-section view taken along line 14—14 of FIG. 13;

DESCRIPTION OF PREFERRED EMBODIMENTS

Figure 1:
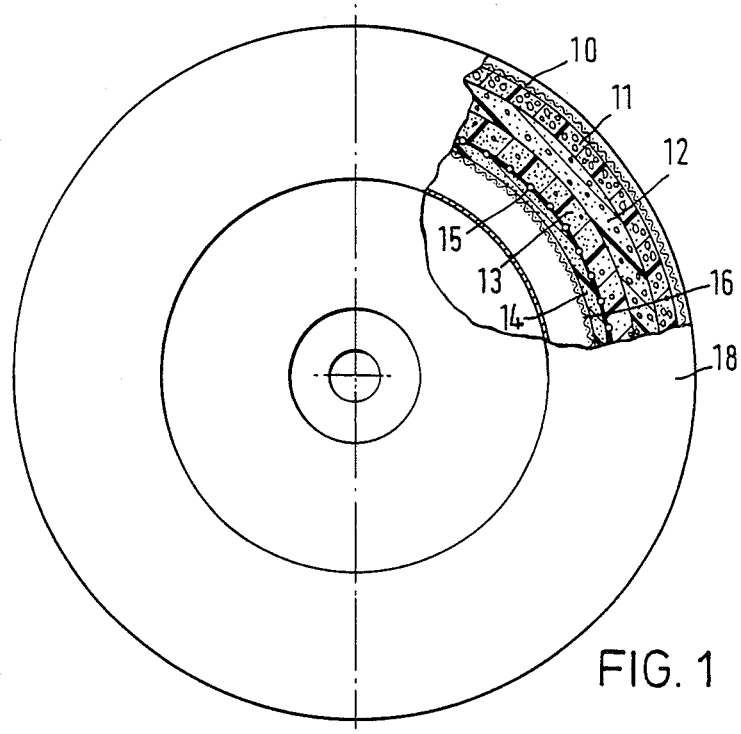
FIG. 1 is a partial plan view of a first embodiment of air filter, with a portion broken away to show details.
Figure 2:
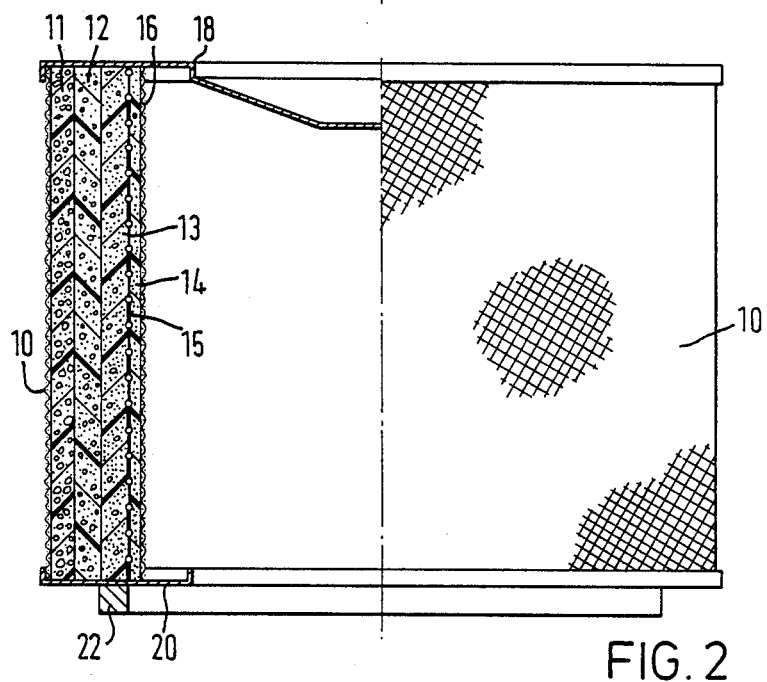
FIG. 2 is a combined side elevation and cross-sectional view of the filter of FIG. 1.

Referring to FIGS. 1 and 2, there is shown an air filter in cylindrical form for fitting into a cylindrical air filter casing mounted on the vehicle. Air is usually drawn tangentially into the casing, then through the wall of the filter and finally through the bottom of the filter and the bottom of the casing, along the axis of the filter and its casing.

The filter shown comprises an outer cylindrical cage 10 formed of perforated sheet metal or of expanded metal, and a similar inner cage 16. Sandwiched between these two concentric cages are a plurality of layers of filter material, which will be described in detail below. The filter is completed by top and bottom metal caps 18, 20 which are bonded to the cages 10 and 16 to form a rigid, integral structure. An annular gasket 22 is bonded to the bottom of the cap 20, to seal against the inside of the filter casing around the air outlet.

The layers of filter material, in the air filter of FIGS. 1 and 2, are as follows. Adjacent the outer cage 10 there is a layer 11 of dry, reticulated foam plastics material, 5-20 mm thick and with a porosity of 8-20 ppi (pores per linear inch). This layer may comprise polyurethane and is preferably rigid or semi-rigid, having had a substance (e.g. pvc) applied to it (e.g. by coating or spraying) to impart to it the required rigidity and without closing any of its pores. Next there is a layer 12 of reticulated foam plastics, 5-20 mm thick and porosity 20-35 ppi. Finally there is a composite formed of two layers 13, 14 of reticulated foam plastics bonded together at their interface with the interposition of an open-mesh substrate 15. The outer of these two layers (13) has a thickness of 10-20 mm and a porosity of 5-60 ppi (preferably 45±4 ppi), and the inner layer (14) has a thickness of 6-10 mm and a porosity of 60-100 ppi (preferably 65±6 ppi). The open mesh substrate is approximately one millimeter in thickness.

The composite 13,14 may be formed as shown in FIG. 7. Layers 13,15 and 14 pass from respective rolls of the materials into superimposed engagement. Just prior to the layers coming together, flames 13A are positioned to play onto the surface of the layer 13. Immediately downstream of this, the layers come together and are pressed together between rolls R,R. The flames soften the surface of the layer 13, such that when the layers are pressed together, the two layers 13,14 bond together (i.e. are flame-bonded) in the openings through the mesh substrate 15. The mesh substrate 15 imparts a degree of mechanical stability to the composite, to prevent the composite distorting when it is being cut to shape and when it is being impregnated (see below). Its main function is however to co-operate with the layers 13,14 at the interface to provide a reservoir for the impregnating substance, as also described below.

The layers 12,13,14 of foam plastics are all impregnated with a plasticiser which serves to hold the particles which are trapped in the filter element: the layer 11 is however dry. The plasticiser may comprise for example a chlorine modified (or chlorinated) long chain paraffinic hydrocarbon which is stabilised for elevated temperature applications by the addition of a soya bean oil extract. The material of the layers 12,13,14 may be polyurethane and the open mesh substrate 15 may comprise a grid or net of flexible polypropylene: the substrate 15 preferably presents a surface area which is not more than 10% of the surface area of layers 13 or 14, so as not to restrict the flow of air through the filter unduly. The substrate 15 acts to hold the impregnant within the composite 13,14, serving as a reservoir for this impregnant at the interface of the two layers 13,14 and in particular in the corners of the openings through the substrate 15, at which corners the layers 13,14 fail to bond together.

The composite 13,14 is impregnated as shown in FIG. 8. The composite 13,14 is passed between two compression rolls R1,R1. The pregnating plasticiser flows onto the top of the upper roll and around its upstream surface, to flow onto the composite just where it is being compressed to substantially the thickness of the substrate 15. The plasticiser thus finds its way to the interface between layers 13,14. The composite returns to its original thickness downstream of the rolls and takes in the plasticiser by suction. Nevertheless the interface region retains a maximum density of the substance. The impregnating process takes place at an elevated temperature (e.g. about 70° C.) so that the plasticiser partially plasticises the foam plastics material of the layers 13,14. The soya bean oil extract in the plasticiser prevents the latter from oxidising at the impregnating temperature and further, as the temperature falls thereafter, stops the plasticiser from acting further on the foam plastics material. The layer 12 may be impregnated in similar manner.

In use of the filter shown in FIGS. 1 and 2, the air flows generally radially inwards and thus the dry layer 11 is the first layer which it meets. The layer sets up a cyclonic effect on the incoming air to cause particles (at least heavier particles) in the air to drop off outside the filter. Indeed, the material of layer 11 has sufficiently large pores (i.e. is sufficiently coarse) that its outer surface is found to behave as a multiplicity of small cyclone separators distributed over that surface, the dry layer presenting a multiplicity of coarse, rigid, open pores to the incoming air. Significant quantities of particles are thus found to separate out at the outer surface of layer 11 and fall to the bottom of the filter casing without penetrating into the filter layers. The successive layers 12,13,14 serve to retain the particles which do penetrate, the pores of these layers being progressively smaller and, in general, trapping the successively smaller particles.

Figure 3:
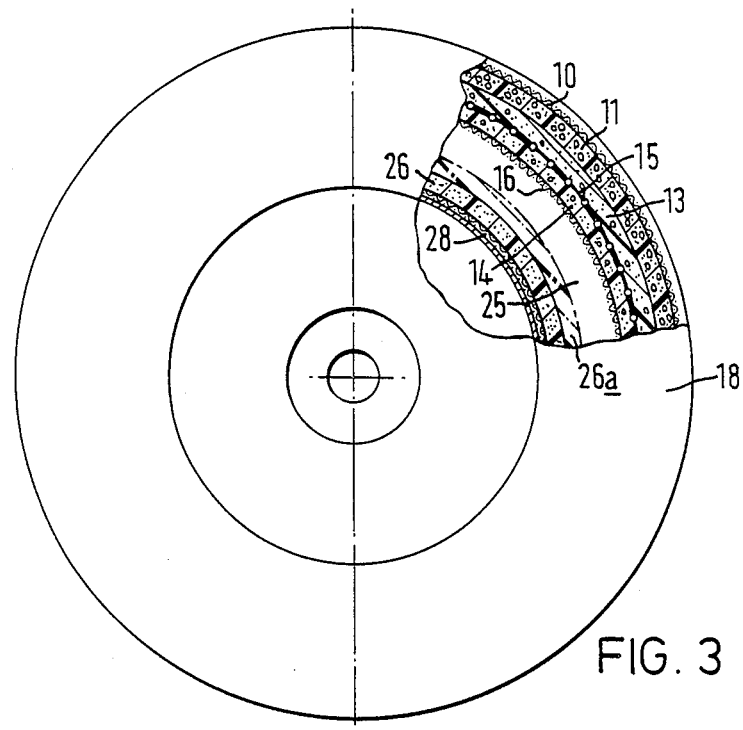
FIGS. 3 and 4 are similar views of a second embodiment of air filter.
Figure 4:
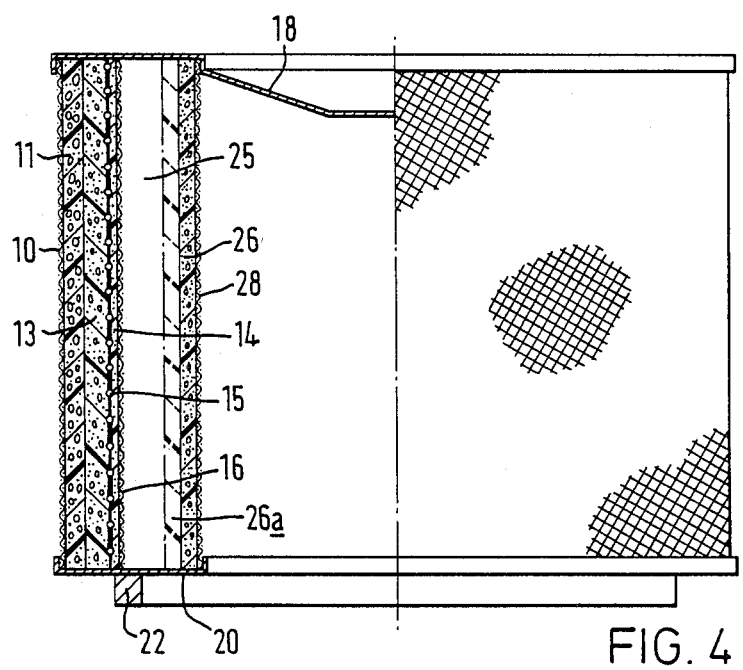

The embodiment of air filter element shown in FIGS. 3 and 4 is similar to that shown in FIGS. 1 and 2 (although the layer 12 is absent) and like-parts are indicated by like-reference numerals. However, a further filter layer 26 is disposed on the inner or downstream side of the filter element, together with a further cage 28 (similar to cages 10 and 16) against which the layer 26 is positioned for support. An air gap 25 of 5-20 mm thickness is provided between the cage 16 and the layer 26.

The additional filter layer 26 not only serves a filtering function, but also acts as a fire-break. The layer 26 comprises a reticulated foam plastics (e.g. polyurethane) with a porosity of 65-100 ppi, and the material has been post-treated with an appropriate fire retardant substance, being impregnated with a substance including fire retardant additives which serve to actively extinguish flames, but without closing any of the pores. The layer 26 may comprise a material available on the market under a trade name "Firend" and conforms to British Standard BS 476 PT 7 Class 1. This material is dry initially but is then impregnated with a plasticizer such as previously specified.

The filter of FIGS. 3 and 4 is thus particularly effective not only for filtering but also for preventing the spread of fire should for some reason the internal combustion engine blow back or even explode (which as previously noted would be unlikely to occur through any failure of the filters described in this specification).

In a modification of the air filter of FIGS. 3 and 4, the fire-break filter layer 26 is replaced by a layer of very fine-pore material, such that in the event of any possible rupturing or breakdown of the outer layers, the pores of this layer will become clogged with dust very quickly and thus prevent any further air and dust passing to the engine. This layer preferably comprises a reticulated foam plastics material which has been permanently compressed in thickness by a predetermined factor to render it effective in filtering substantially smaller particles than the base, uncompressed material. Such permanent compression is achieved by compressing the base material at elevated temperature, such that when the compressing force is removed, the material remains compressed in thickness. By compression factor is meant the ratio of the initial thickness to the thickness after the permanent compression: for the air filter shown, a base material of porosity 65–85 ppi, compressed by a factor of 2–6 may be used, the final thickness being 1–2 mm. The layer may be provided together with the fire-break layer, the latter being moved to 26a and the permanently compressed layer positioned at 26 as shown in FIGS. 3 and 4.

In a modification applicable to either of the embodiments shown in FIGS. 1–4, the outer surface of the outer layer 13 of the composite 13,14 (or instead the outer surface of the layer 12 in FIGS. 1 and 2), may be profiled so as to increase its surface area, and thus enhance its dust-holding capacity. One example of an appropriate profiling is shown in FIGS. 5a, 5b: the cross-section undulates in both of two perpendicular directions and in essence the surface exhibits a plurality of distributed pyramids. Such profiling may be achieved by passing a sheet 1 of foam plastics material between a pair of rollers 30,31 as shown in FIGS. 6,6a and onto a cutting edge 32 which divides the sheet 1 into two layers 2,3. The two rollers are provided with teeth around their circumference: the teeth on each roller undulate along their length as shown, but the teeth of one roller mesh with the teeth of the other roller. Accordingly, the sheet 1 is differently compressed such that when divided by the cutting edge 32, the two layers 2,3 (when relieved of the compressing force) exhibit profiled surfaces facing each other and complementarily fitting together: when then lifted apart, two profiled layers are provided for use in air filters.

Various other modifications may be made to the filters which have been described with reference to FIGS. 2–4 of the drawings. Firstly, an air gap of 5–20 mm may be provided between the outer metal cage 10 and the dry layer 11. Secondly, in FIGS. 1 and 2 the layer 12 may be dispensed with and the dry layer 11 placed in contact with the composite 13,14: conversely the layer 12 may be provided in FIGS. 3 and 4. If the flow of air is to be radially outwards instead of radially inwards, then the order of the various component layers would be reversed. Instead of a cylindrical configuration for the air filter element, other configurations may be employed: for example the element may be in the form of a panel, with all the layers laid flat and held within the peripheral frame (e.g. of rectangular shape).

The end caps, instead of being of metal and bonded on, may be of plastics, either moulded separately and bonded on or moulded in situ.

The air filter elements which have been described provide a particularly effective filtering function and the lifetime of the elements is substantially extended relative to filters which have hitherto been available for the corresponding applications.

The composite 13,14 imparts a fail-safe action to the filters which have been described. At the interface between the two layers 13 and 14, the pore size is smaller than elsewhere within the composite, and a higher density of the impregnant is retained. The dust therefore collects mostly at this interface, thus constricting the pores even further. Gradually, a pressure drop builds up across the filter layers, causing the inner or downstream layer 14 (see FIGS. 1,2 and 3,4) to be compressed against the metal cage 16. Eventually, this compression is sufficient to shut off the inner layer 14 completely, starving the engine of air and causing it to stop. The dust which has been retained within the filter composite however remains in position and is not sucked through the filter towards the engine. The permanently compressed layer, when provided as layer 26 in FIGS. 3,4 acts as an additional fail-safe feature as described above.

In the composite 13,14, the two layers may be bonded together using adhesive and still achieve the prefered feature that the pore-size adjacent the interface is smaller than elsewhere within the two layers.

It will also be appreciated that, with the particular example of impregnant given, this has flame-retarding properties owing to the chlorine given off on combustion.

The embodiments of filter shown in FIGS. 9 to 16 consist of an air filter 110 having a primary or first layer 112 and a second layer 114 of foam plastic material with an open mesh substrate 116 at the interface between the two layers. Each layer 112 and 114 is a reticulated foam plastic of polyurethane. The open pores of first layer 112, which is the layer onto which the air impinges as indicated by arrow 118, has coarser open pores then second layer 114. For example layer 112, may have a porosity of 45±4 pores to the linear inch, and second layer 114 may have a porosity of 65±6 pores to the linear inch. For example also, the thickness of first layer 112 may be between 10 mm and 20 mm and the thickness of second layer 114 may be between 6 mm and 10 mm. The total thickness of filter 110 may for example lie between 15.5 mm and 30 mm. Open mesh substrate 116 may comprise a grid of flexible polypropylene. In order not to restrict the flow of air through filter 110 unduly, substrate 116 preferably does not have a surface area more than 10% of the surface area of layer 112 or 114.

Filter 110 is formed by bonding first layer 112 to second layer 114 at their interface 113. Mechanical attachment of the layers 112 and 114 by flame bonding (in a mannner as previously described) is preferred since a minimum thickness of the two layers is affected which would adversely affect the operation of the filter. Preferably the thickness of bonding is limited to 0.5 mm. Chemical bonding may be used to attach layers 112 and 114, for example using an isocyanate adhesive.

Filter 110 is impregnated with a retentive additive (as previously described) to hold the dust particles which are trapped in the filter. Open-mesh substrate 16 acts to ensure that the correct amount of retention additive is retained in filter 110 and also acts as a reservoir for the additive at interface 113 between layers 112 and 114.

Figure 11:
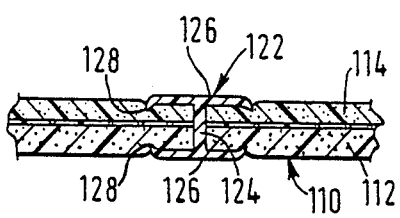
FIG. 11 is a cross-sectional view taken along line 11—11 of FIG. 10.
Figure 12:
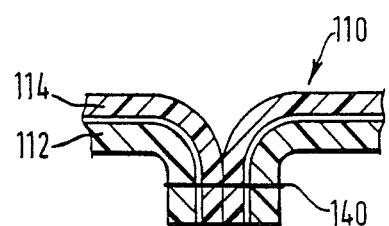
FIG. 12 is a cross-sectional view similar to FIG. 11 showing the opposed edges of the cylinder stitched.

Filter 110 may be used in its flat configuration or it may be formed into a hollow cylinder 119 as seen in FIG. 10. If flat, as gasket 120 may be bonded to the filter as shown in FIGS. 13 and 14. To form a cylinder, opposing edges of the filter are clamped together and for example a clamp 122 employed in strip form, as shown in FIGS. 10 and 11 are preferably of extruded PVC, having a central web 124 interconnecting a pair of spaced flanges 126 which carry opposed inwardly directed ridges 128. Flanges 126 are sufficiently flexible to be spread apart for the insertion of the opposed edge portions of filter 110 and when the opposed edges each come into contact with web 124 the flanges are released, allowing ridges 128 to press into the filter and clamp it. The use of clamp 122 is advantageous since it seals the joined edges of filter 110 against leakage of air around the filter. Also, clamp 122 may be positioned directly in front of the stream of air directed to the filter, thus dissipating the air around the filter instead of impinging directly on it in a restricted area. Instead, the opposing edges of hollow cylinder 119 may be held together by stitching 140 as seen in FIG. 12.

Figure 15:
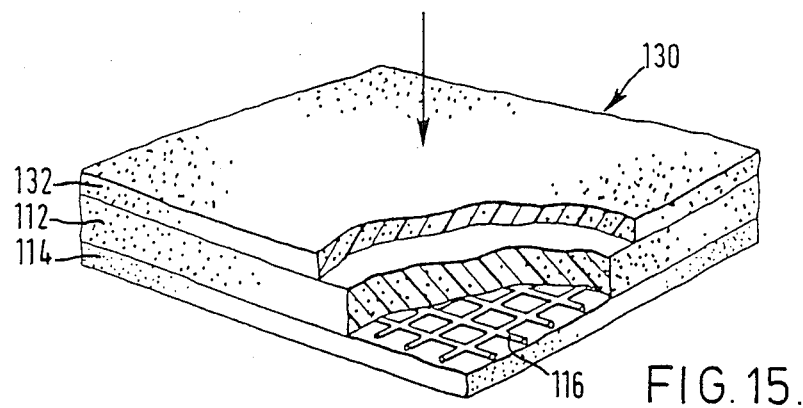
FIG. 15 is a perspective view, similar to FIG. 9, showing another embodiment of the filter of the invention.
Figure 16:
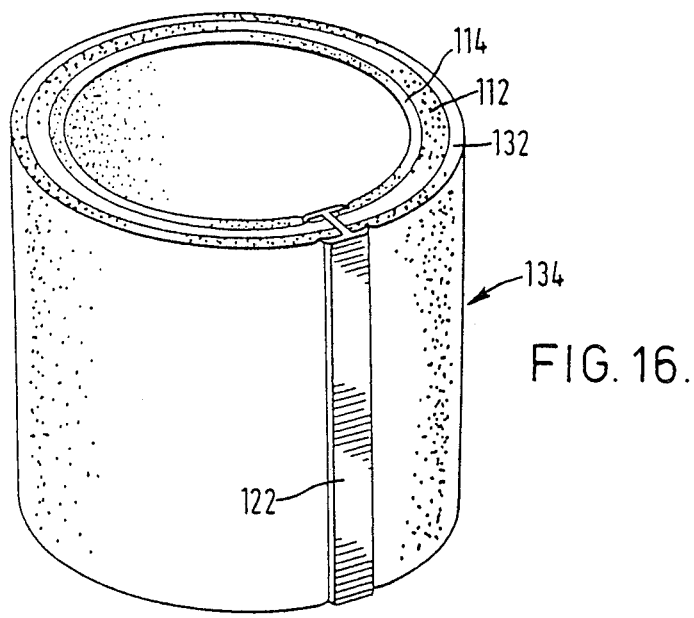
FIG. 16 is a perspective view of a hollow cylindrical configuration of the filter of FIG. 15.

In the embodiment shown in FIGS. 15 and 16 an air filter 130 has a third, outer layer 32 made of stiff reticulated foam plastic for example 5 to 10 millimeters thick and not adhering to layer 112 but abutting that layer. This outer layer 132 is useful for heavier duty engines and acts as a purge screen, setting up a cyclonic effect on the incoming air which causes heavier particles in the air to drop off (into the filter casing, not shown) outside the filter, as perviously described FIG. 15 shows filter 130 formed into a cylinder 134.

The dry layer 11 of FIGS. 1 to 4 and the dry layer 132 of FIG. 16 are not bonded to their adjacent layers, although they are located top-and-bottom. In use, with rapid changes in air flow (due to variations in engine manifold suction), the dry layer tends to vibrate and this action tends to clear this layer of dust. Where the material of this layer is coated with PVC, this prevents the material being plasticised by any of the plasticiser (impregnating the other layers) which migrate to the dry layer.

What is claimed is:

1. An air filter comprising a first layer of reticulated foam plastics material, a second layer of reticulated foam plastics material, and an open mesh substrate at the interface between said first and second layers of foam plastics material, said first and second layers of foam plastics material being bonded together at said interface through the openings in said open mesh substrate, and said filter being impregnated with a dust-retaining substance and having a reservoir of said substance at the open mesh substrate between said first and second layers of foam plastics material.

2. An air filter as claimed in claim 1, in which said dust-retaining substance comprises a plasticiser.

3. An air filter as claimed in claim 2, in which said plasticiser has been impregnated into the air filter at an elevated temperature so as to have partially plasticised the foam plastics material of said first and second layers.

4. An air filter as claimed in claim 1, in which said first and second layers are flame-bonded together.

5. An air filter as claimed in claim 1, in which said first layer has pores at least as large as those of said second layer and the filter is arranged so that said first layer is upstream of the second layer with respect to the flow of air through the filter.

6. An air filter as claimed in claim 5, further comprising a third layer upstream of said first and second layers, said third layer comprising a reticulated foam plastics material which is dry and at least semi-rigid and is of sufficiently coarse pore size that its upstream surface behaves as a multiplicity of cyclone separators distributed over that surface.

7. The air filter of claim 1 which includes a further layer which comprises a reticulated foam plastics material which is dry and at least semi-rigid and is of sufficiently coarse pore size that its upstream surface behaves as a multiplicity of cyclone separators distributed over that surface.

8. An air filter as claimed in claim 7, in which the dry foam plastics material of said further layer has had a substance applied to it to impart its rigidity to it.

9. The air filter of claim 1 which includes a further layer of reticulated foam plastics material which has been post-treated with a fire-retardant substance, such that this layer acts both as a filter and a fire-break.

10. The air filter of claim 1 which includes an additional layer of reticulated foam plastics filter material of sufficiently small pore-size as to clog rapidly in the event of a rupture in or breakdown of the upstream layer(s).

11. An air filter as claimed in claim 10, in which said additional layer of foam plastics material has been permanently compressed in thickness.

12. The air filter of claim 1, wherein said first layer has a porosity of from about 5 to 60 ppi.

13. The air filter of claim 12, wherein said first layer has a porosity of 45±4 ppi.

14. The air filter of claim 1, wherein said first layer has a thickness of from about 10 to 20 mm.

15. The air filter of claim 1, wherein said second layer has a porosity of from about 60 to 100 ppi.

16. The air filter of claim 15, wherein said second layer has a porosity of 65±6 ppi.

17. The air filter of claim 1, wherein said second layer has a thickness of from about 6 to 10 mm.

18. The air filter of claim 1, wherein said open-mesh substrate comprises a rectangular grid of about 1 mm in thickness.

19. The air filter of claim 7, wherein said dry further layer has a porosity of from about 8 to 20 ppi.

20. The air filter of claim 19, wherein said dry further layer has a thickness of from about 5 to 20 mm.

21. The air filter of claim 10, wherein said additional layer comprises a layer of material of from about 65 to 85 ppi which has been permanently compressed by a factor of from 2 to 6.

22. The air filter of claim 1 wherein one of the layers of reticulated foam plastic material is profiled to increase its effective area.

23. An air filter which includes a layer of filter material and, upstream thereof, a further layer which comprises a reticulated foam plastics material which is dry, at least semi-rigid, and impregnated with plasticizer and is of sufficiently coarse pore size that its upstream surface behaves as a multiplicity of cyclone separators distributed over said surface.

24. An air filter which includes a layer of filter material and, downstream of said layer, a further layer of reticulated foam plastics material which has been impregnated with a plasticizer and post-treated with a fire-retardant substance, such that said layer acts as both a filter and a fire-break.

25. An air filter which includes a layer of filter material and, downstream of said layer, an additional layer of reticulated foam plastics material impregnated with plasticizer and of a sufficiently small pore size as to clog rapidly in the event of a rupture in or breakdown of the upstream layer.

26. An air filter comprising a layer of reticulated foam plastics filter material impregnated with plasticizer and profiled to increase its effective area.

27. An air filter comprising a layer of reticulated foam plastics material impregnated, at an elevated temperature, with a plasticizer so as to partially plasticize said foam plastic material.

28. The air filter of claim 27 wherein the plasticizer is a chlorinated long chain paraffinic hydrocarbon.

29. The air filter of claim 28 wherein the filter is stabilized for high temperature operation by the addition of soy bean oil extract.

* * * * *